(12) United States Patent
McNeal

(10) Patent No.: US 10,806,152 B1
(45) Date of Patent: Oct. 20, 2020

(54) METHOD AND APPARATUS FOR POULTRY EUTHANASIA

(71) Applicant: William D. McNeal, Greenville, AL (US)

(72) Inventor: William D. McNeal, Greenville, AL (US)

( * ) Notice: Subject to any disclaimer, the term of this patent is extended or adjusted under 35 U.S.C. 154(b) by 0 days.

(21) Appl. No.: 16/530,432

(22) Filed: Aug. 2, 2019

(51) Int. Cl.
| A22B 3/00 | (2006.01) |
| A22B 3/08 | (2006.01) |
| A61D 7/04 | (2006.01) |
| A22B 3/02 | (2006.01) |

(52) U.S. Cl.
CPC ............. *A22B 3/086* (2013.01); *A22B 3/02* (2013.01); *A61D 7/04* (2013.01); *A22B 3/005* (2013.01)

(58) Field of Classification Search
CPC .............. A22B 3/00; A22B 3/086; A22B 3/10
USPC ............................ 452/52, 54, 57, 61, 63, 66
See application file for complete search history.

(56) References Cited

U.S. PATENT DOCUMENTS

| 1,310,294 A | 7/1818 | Rece |
| 1,356,941 A | 10/1920 | Rece |
| 2,417,890 A | 3/1947 | Staudenbiel |
| 3,203,036 A | 8/1965 | Allison |
| 3,475,785 A * | 11/1969 | Woods ............... A22C 21/0015 452/63 |
| 3,918,125 A * | 11/1975 | Strandine .......... A22C 21/0015 452/54 |
| 2012/0094002 A1* | 4/2012 | Van Stuijvenberg .... A22B 3/06 426/644 |
| 2013/0309953 A1* | 11/2013 | Van Stuijvenberg .... A22B 3/12 452/58 |

* cited by examiner

*Primary Examiner* — Richard T Price, Jr.
(74) *Attorney, Agent, or Firm* — George L Williamson

(57) ABSTRACT

Method and apparatus for a device used to euthanize poultry. The device restrains the animal via a head restraint which is placed to pull the head down while the legs are held upwardly in leg shackles. The head restraint is offset in order to contact the head at an angle that is not in line with the bird's spine which is important for proper cervical dislocation. The head restraint bar floats or moves on guide rods on either side to keep it from twisting. A ramrod runs vertically all the way to the top of the machine and past the legs of a chicken and an impact/stop is welded onto the rod with an approximate five pound slide hammer on top of the stop. With a chicken properly restrained in the device, the slide hammer is used to slam on the impact/stop which then causes complete and perfect cervical dislocation so that the animal is brain dead without any blood.

14 Claims, 4 Drawing Sheets

US 10,806,152 B1

METHOD AND APPARATUS FOR POULTRY EUTHANASIA

BACKGROUND OF THE INVENTION

Field of the Invention

The present invention relates generally to poultry, and more particularly, is concerned with a device for euthanasia of poultry.

According to the 2013 Edition of the American Veterinary Medical Association (AVMA) Guidelines for the euthanasia of animals, the approved methods for the euthanasia of poultry include gas inhalation, manually applied blunt force trauma, cervical dislocation, decapitation, electrocution, gunshot, captive bolt, and injectable agents. The present invention deals only with cervical dislocation which is an approved method of euthanasia for poultry.

Description of the Related Art

Devices relevant to the present invention have been described in the related art; however, none of the related art devices disclose the unique features of the present invention.

In U.S. Pat. No. 3,203,036 dated Aug. 31, 1965, Allison disclosed a poultry head chopper construction. In U.S. Pat. No. 2,417,890 dated Mar. 25, 1947, Staufenbiel disclosed a poultry decapitator. In U.S. Pat. No. 1,356,941 dated Oct. 26, 1920 Rece disclosed a poultry killer. In U.S. Pat. No. 1,310,294 dated Jul. 15, 1919, Rece disclosed a poultry decapitator.

While these devices may be suitable for the purposes for which they were designed, they would not be as suitable for the purposes of the present invention as hereinafter described. As will be shown by way of explanation and drawings, the present invention works in a novel manner and differently from the related art.

SUMMARY OF THE PRESENT INVENTION

The present invention discloses a device which is used to euthanize poultry, specifically large roosters. The present invention generally restrains the animal via a head restraint which is placed to pull the head down while the legs are held upwardly in leg shackles. The head restraint is offset in order to contact the head at an angle that is not in line with the bird's spine which is important for proper cervical dislocation. The head restraint bar floats or moves on guide rods on either side to keep it from twisting. A ramrod runs vertically all the way to the top of the machine and past the legs of a chicken and an impact/stop is welded onto the rod with an approximate five pound slide hammer on top of the stop. With a chicken properly restrained in the device, the slide hammer is used to slam on the impact/stop which then causes complete and perfect cervical dislocation so that the animal is brain dead without any blood.

An object of the present invention is to provide a poultry euthanasia device which prevents spilling of blood. A further object of the present invention is to provide a poultry euthanasia device which can be used by a single individual person. A further object of the present invention is to provide a poultry euthanasia device which utilizes a method approved by the AVMA. A further object of the present invention is to provide a poultry euthanasia device which provides instant cervical dislocation without blood being spilled. A further object is to restrain an animal prior to and during euthanasia as there is no struggle with the animal after it is placed in the leg and head shackles; it is believed that no other device accomplishes this. A further object of the present invention is to provide a poultry euthanasia device which can be easily used by an operator. A further object of the present invention is to provide a poultry euthanasia device which can be relatively easily and inexpensively manufactured.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
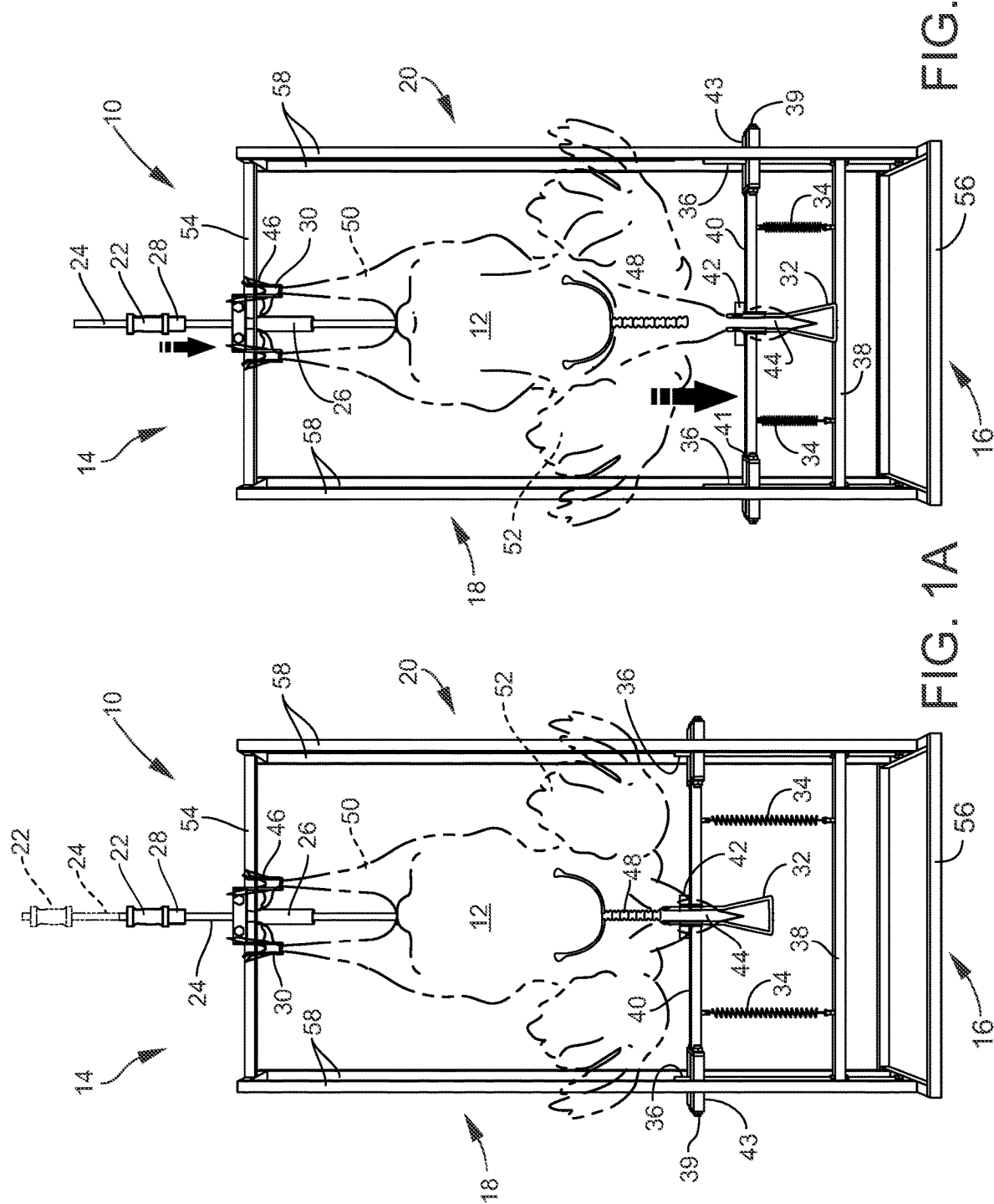
FIG. 1A is a front perspective view of the present invention shown in operative connection with an animal body prior to cervical dislocation.
FIG. 1B is a front perspective view of the present invention shown in operative connection with an animal body after cervical dislocation.

With regard to reference numerals used, the following numbering is used throughout the drawings.

10 present invention
12 animal body
14 top end
16 bottom end
18 left side
20 right side
22 slide hammer
24 ramrod
26 ramrod guide
28 slide hammer stop
30 leg shackle
32 head shackle or restraint
34 restraint springs
36 guide/adjustment rod
37 nut
38 adjustable bar
39 bolt
40 head restraint bar
41 flange of head restraint bar
42 base mount for ramrod
43 guide block 44 head of animal
46 feet of animal
48 neck of animal
50 leg of animal
52 wing of animal
54 upper cross bar
56 lower base
58 side members
60 cross bar

DETAILED DESCRIPTION OF THE PREFERRED EMBODIMENT

The following discussion describes in detail at least one embodiment of the present invention. This discussion should not be construed, however, as limiting the present invention to the particular embodiments described herein since practitioners skilled in the art will recognize numerous other embodiments as well. For a definition of the complete scope of the invention the reader is directed to the appended claims. FIGS. 1A through 4 illustrate the present invention wherein a poultry euthanasia device is disclosed and which is generally indicated by reference number 10.

Turning to FIGS. 1A-3, therein is shown the present invention 10 wherein an animal 12, i.e. a chicken or domestic fowl, can be suspended thereon wherein the present invention has in general an upper end 14, a lower end 16, a left side 18 and a right side 20. The present invention 10 is assembled about a framework including an upper end 14 which includes a horizontal upper cross bar 54, the lower end 16 includes a lower base or stand 56 having a pair of spaced apart members 56, and the left and right vertical side members 58 each includes a pair of spaced apart members 58 joined together by a cross bar 60 at the top and the lower base 56 at the bottom. The present invention 10 includes a slide hammer 22 which has a weight of about five pounds and about a five-eights inch inside diameter which slides along a ramrod 24 which ramrod slides freely through the ram rod guide 26 and keeps the ramrod guide 24 centered which ramrod is attached by welding or the like to base mount 42 so that the ramrod moves with the base mount 42 on the head restraint bar 40; the slide hammer moves about 8-10 inches as it slides. Also shown is a slide hammer stop 28 which is fixedly attached by welding or the like to the ramrod 24 so that when the animal 12 is placed in the present invention 10 it will move above the frame 54 (see FIG. 1A) to allow the ramrod 24 to move down and cause cervical dislocation (see FIG. 1B). Also shown are leg shackles 30 along with a head shackle or restraint 32 wherein the head is placed in a large v-shaped portion and the neck is moved up until the base of the chicken's head is pressed against the shackle so that all pressure is on the base of the skull and none on the neck. Also shown are a plurality of restraint springs 34 which keep constant pressure on the chicken's neck 48 and legs 50 which is very important and allows all force to be applied to stretching the chicken's neck until dislocation instead of straightening out the neck.

Also shown are left and right guide or adjustment rods 36 upon which the head restraint bar 40 floats wherein the bottom of the rods 36 are threaded for adjustment of the adjustable bar 38 using nuts 37 so as to accept different sizes of animals for euthanasia. Nuts 37 or the like are placed on the guide/adjustment rods 36 for use in adjusting the height of the adjustable bar 38. The top of the rods 36 are smooth to allow for free movement of the head restraint bar 40 which floats freely up and down along the guide adjustment rods 36 and keeps the animal 12 restrained using springs 34 which provides tension to the animal and helps dislocate the cervical vertebrae via the ramrod 24. Head restraint bar 40 has a flange 41 on each end to which flange is bolted a guide block 43 on each end thereof using bolts 39. The guide blocks 43 are made of plastic to reduce friction as the guide block slides freely along the guide/adjustment rods 36; the guide blocks 43 have holes slightly larger than the guide rods 36 and keep the head restraint bar 40 and ram rod 24 centered along with keeping the animal body 12 straight. The guide blocks 43 are replaceable as they wear out. Also shown is a base mount 42 for the ramrod 24 wherein the ramrod is attached by welding onto the base and the base is bolted to the head restraint bar 40. The head shackle 32 is attached by welding to the face opposing the ramrod 24.

Turning to FIG. 1A shows the present invention 10 in a first position prior to euthanasia wherein the animal 12 is ready for euthanasia with its head and legs restrained; FIG. 1B shows the present invention 10 in a second position after cervical dislocation of the animal wherein the neck 48 has been dislocated from the skull/head 44 of the animal. The dorsal side of the animal 12 is turned so as to be oriented toward the front of the present invention 10.

Figure 4:
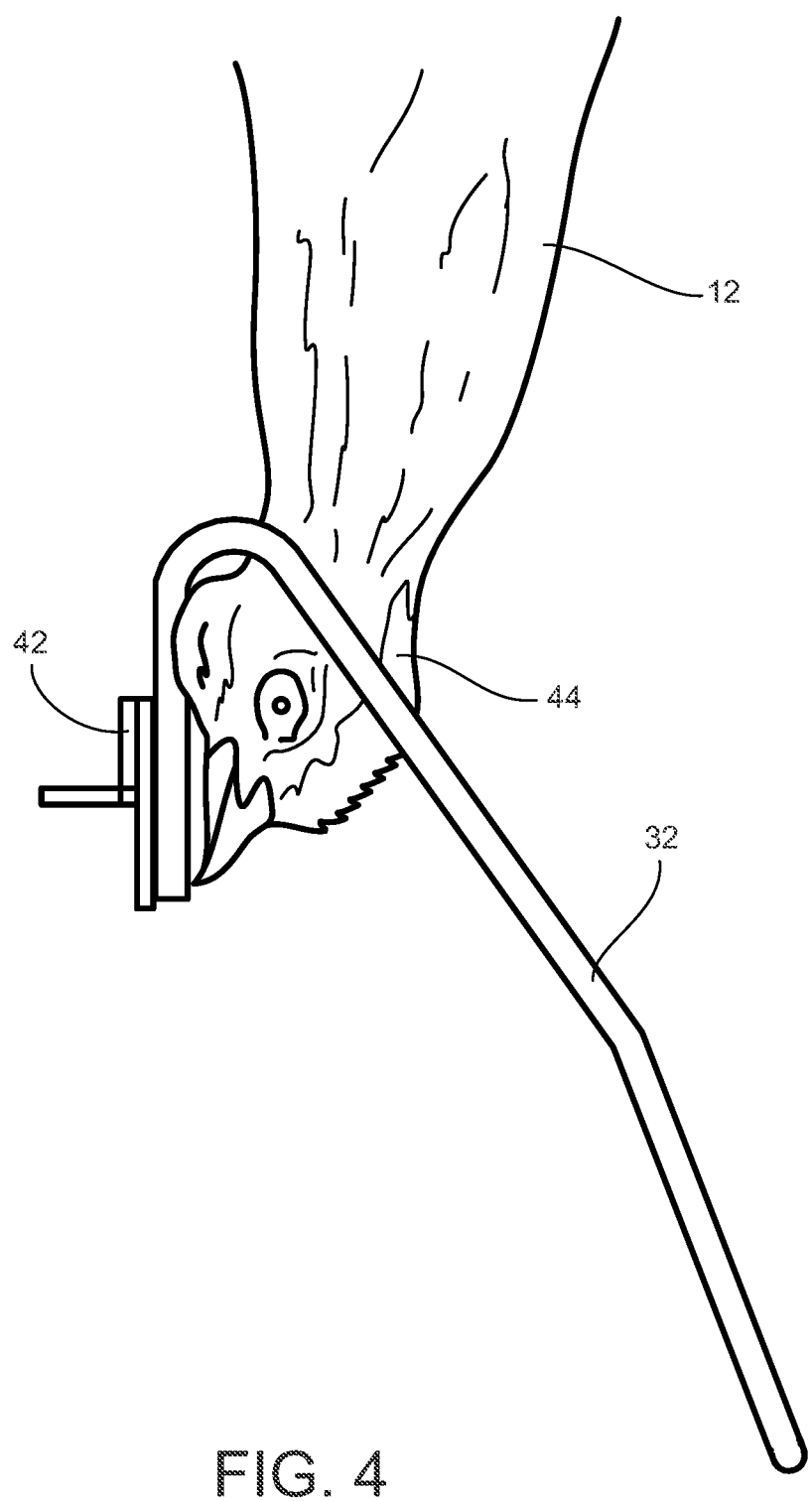
FIG. 4 is an enlarged side perspective view of a head of an animal held in the head restraint of the present invention.

Turning to FIG. 4, therein is shown the head 44 of an animal 12 disposed in the head restraint 32 in the position ready for cervical dislocation with the dorsal side toward the front of the present invention 10.

The present invention 10 can be used to euthanize poultry, especially large roosters. In the poultry industry when poultry need to be euthanized it must be done using a method that is approved by American Veterinary Medical Association (AVMA) to ensure that the poultry animal was treated in a humane and animal welfare focused way. There are currently only a few approved methods which are cervical dislocation or rapid decapitation. Rapid decapitation is rarely used due to the blood that is necessarily spilled. Cervical dislocation is used most and is primarily done manually which is normally not a problem unless the chicken is very large and, therefore, many people cannot properly euthanize a rooster over 10 pounds. The present invention 10 generally restrains the chicken via a head restraint 32 which has springs 34 to pull the head 44 down while the feet 46 are put in leg shackles 30. The head restraint 32 is offset in order to contact the head 44 to an angle that is not in line with the bird's spine. This is important for proper cervical dislocation. The head restraint bar 40 is floating with guide rods 36 at either side which keep it from twisting. Opposite the head restraint bar 40 is a one-half inch rod which runs vertically all the way to the top of the invention and past the feet 46 of the chicken 12. The impact/stop 28 is welded onto the rod 24 and the rod continues past the impact/stop eighteen inches where a five pound slide hammer 22 sits on top of the stop. With the chicken 12 properly restrained in the present invention 10 (with all the pressure from the head restraint 100% on the chicken's skull base) the slide hammer 22 is used to slam on the impact/stop 28 which then causes complete and instant cervical dislocation (rendering the animal 12 instantly brain dead) without any blood being spilled.

The present invention 10 only requires one person for operation and can be operated by any person of average strength and can kill any size chicken 12. Several components of the present invention 10 are attached by welding; one skilled in the art would understand that other means of attachment could be used to attach the components to each other.

The operation of the present invention 10 may be described by reference to FIGS. 1A-3 as follows: in FIG.

Figure 2:
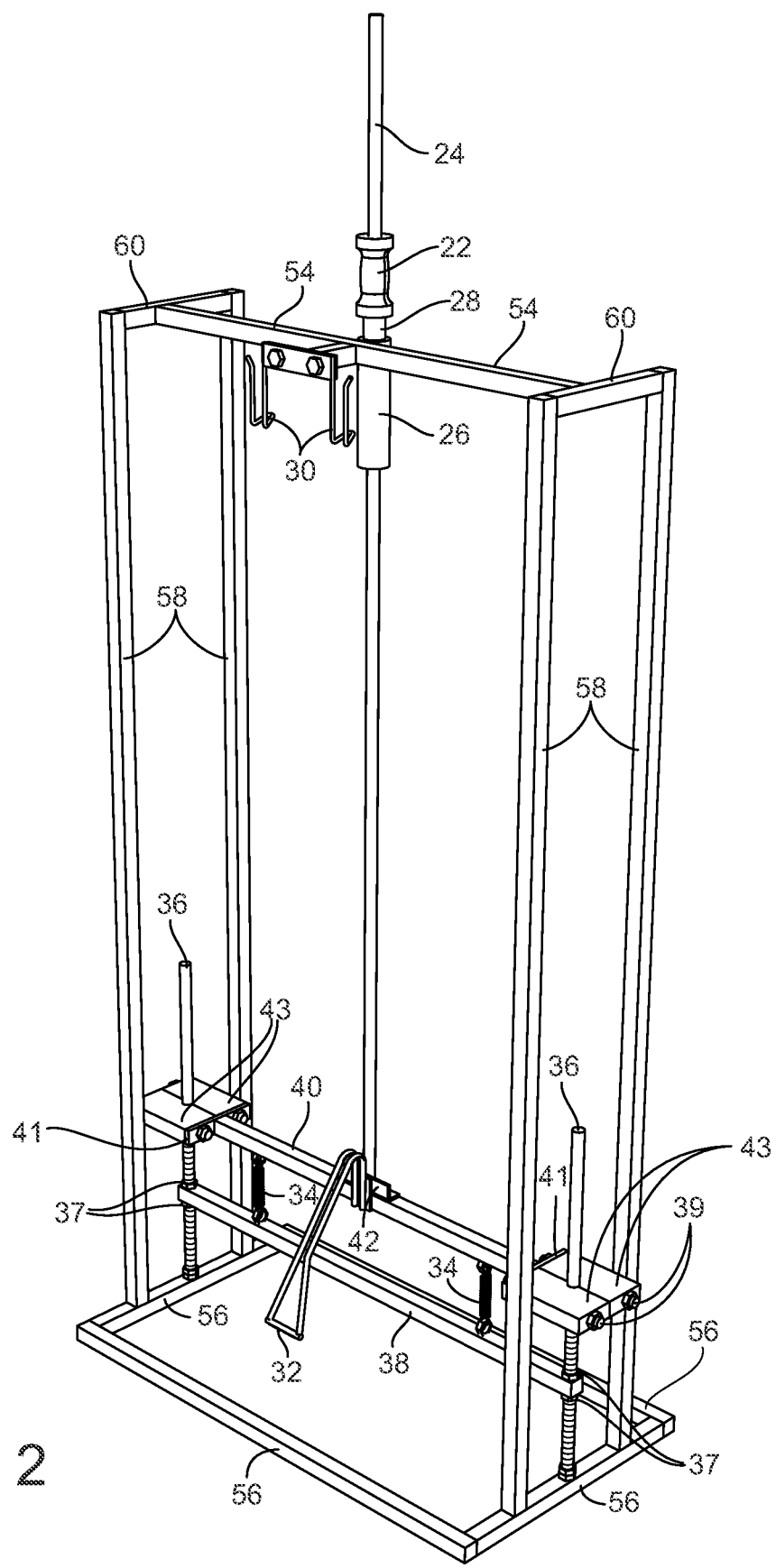
FIG. 2 is a perspective view of the front side of the present invention.
Figure 3:
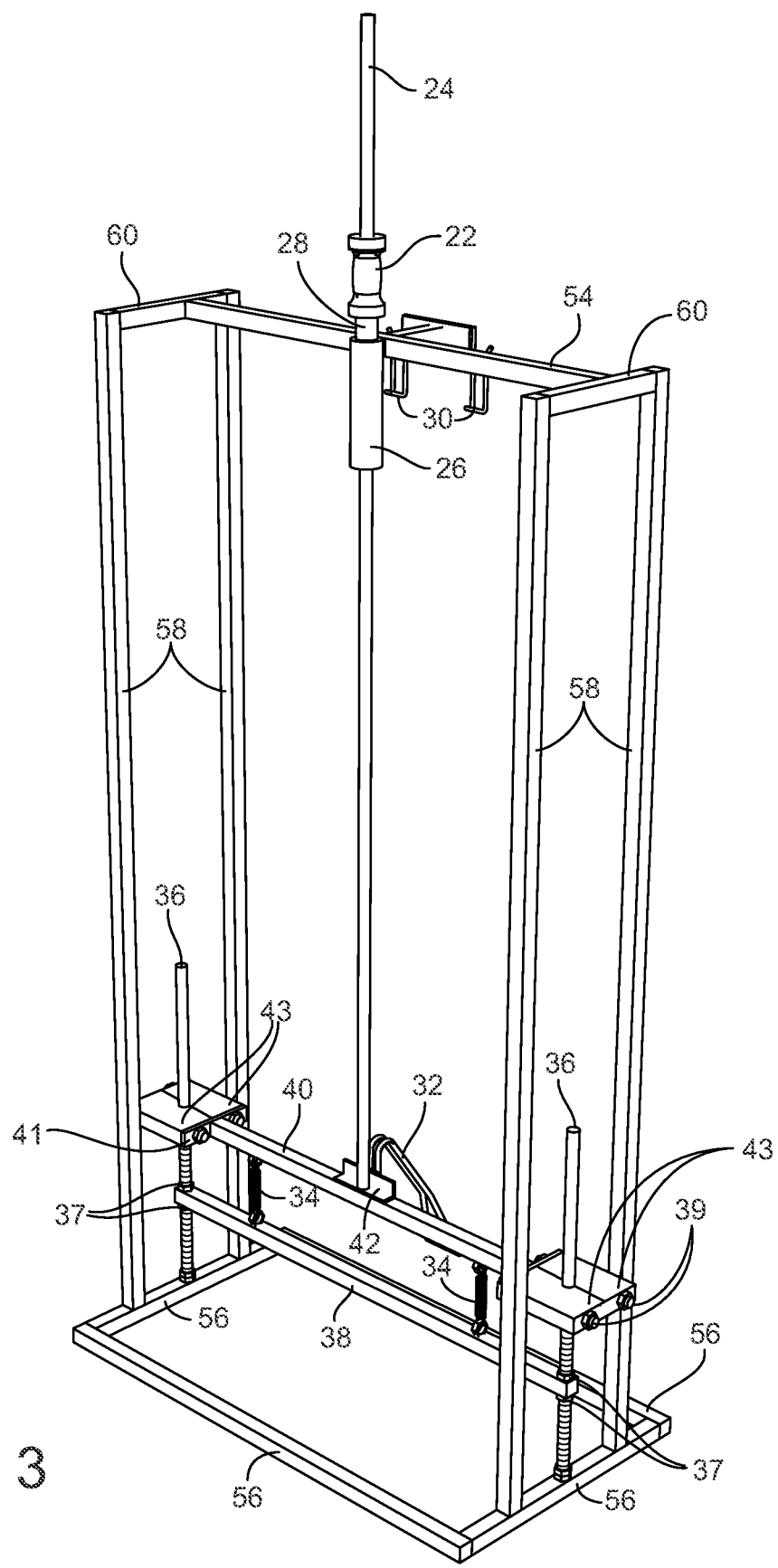
FIG. 3 is a perspective view of the back side of the present invention.

1A, the animal 12 is shown suspended by its legs 50 with its head in the head shackle 32 causing the head restraint bar 40 to be raised upwardly so that the springs 34 bias the head restraint bar downwardly thereby placing tension on the animal's body. The hand of a user would then grasp the slide hammer 22 quickly lifting it upwardly (to a point approximately indicated by the slide hammer 22 shown in phantom line on FIG. 1A) and then slamming it downwardly into the slide hammer stop 28 causing the head restraint bar 40 to be suddenly and quickly moved downwardly causing cervical dislocation of the animal 12. As shown in FIG. 2B, immediately following cervical dislocation, the head restraint bar 40 is moved downwardly by the force of the slide hammer 22 striking the slide hammer stop 28 causing the springs 34 to be near a neutral position or having no more than a slight downward bias to the head restraint bar 40. Note that the springs 34 never cause the head restraint bar 40 to be biased upwardly. The height of the head restraint bar 40 is adjusted so that when the slide hammer 22 is caused to slam into the slide hammer stop 28 the head restraint bar is caused to travel a great enough distance to complete the cervical dislocation of animal 12. As shown in FIGS. 2-3, when there is no animal 12 suspended in the present invention 10, the weight of the ramrod 24 and slide hammer 22 would cause the slide hammer stop 28 to rest at its stop point on the upper end of the ramrod guide 26.

The present invention 10 is expected to be made of metal or the like and the approximate sizes of some of the components of the present invention 10 follow: The approximate size of the square tubing used for the present invention 10 is ¾ inches. The dimensions of the lower base 56 is about 14"×25". The approximate overall height of the present invention 10 is about 49 inches. The approximate distance from the floor to the first crossbeam 38 is 5 inches. The approximate overall distance between the lower crossbeam 38 and the intermediate crossbeam 40 is about 6 inches. The approximate size of one white guide block 43 is 4"×2.5". The approximate distance from the floor to the bottom of the head restraint 32 is about 6 inches.

By way of summary and by making reference to FIGS. 1A to 4, the present invention 10 discloses a method for euthanasia of poultry 12 including a) providing a framework for suspension of a domestic fowl 12 comprising a base 56 with a frame structure 58 extending up from the base; b) providing an upper horizontal cross bar 54 mounted in a top end 14 of the frame structure; c) providing a pair of leg shackles 30 attached to the upper horizontal cross bar adapted to support legs 50 of the domestic fowl; d) providing a head restraint bar 40 within the frame structure below the upper horizontal cross bar, the head restraint bar extending between a pair of guide blocks 43; e) providing a fixed adjustable bar 38 mounted in the frame structure below the head restraint bar for supporting the head restraint bar using upwardly extending springs 34 attached at lower ends thereof to the fixed adjustable bar and at upper ends thereof to the head restraint bar, f) providing vertical guide rods 36 extending up through the guide blocks from the base for preventing the head restraint bar from twisting; g) providing a ram rod guide 26 mounted on the upper horizontal cross bar; h) providing a slidable vertical ram rod 24 extending through the ram rod guide terminating at a lower end thereof at the head restraint bar, the ram rod extending above the ram rod guide; i) providing a head shackle 32 mounted on the head restraint bar adapted to restrain the head 44 of the domestic fowl; j) providing a slide hammer 22 on the ram rod above the upper horizontal cross bar k) placing the legs of the domestic fowl in the leg shackles with the head of the domestic fowl extending downwardly; l) placing the head of the domestic fowl in the head shackle so that springs bias a body of the domestic fowl under tension; and m) slamming the slide hammer downwardly causing cervical dislocation of the domestic fowl without any blood being spilled. Furthermore, in which the fixed adjustable bar is threadably engaged with the vertical guide rods for adjusting the vertical positions of the fixed adjustable bar and head restraint bars and attaching a slide hammer stop 28 to the ram rod under the slide hammer and above the upper horizontal cross bar to limit downward movement of the ram rod when being slammed downwardly.

Left and right side designations regarding the present invention 10 are interpreted from the view of one looking into the page of FIG. 1A. Also, lines with arrowheads are sometimes placed on drawings to indicate potential motion or direction of movement of an item illustrated in the drawing.

I claim:

1. An apparatus for euthanasia of poultry, comprising:
   a) a framework for suspension of a domestic fowl comprising a base with a frame structure extending up from said base;
   b) an upper horizontal cross bar mounted in a top end of said frame structure;
   c) a pair of leg shackles attached to said horizontal upper cross bar adapted to support legs of said domestic fowl;
   d) a head restraint bar disposed within said frame structure below said upper horizontal cross bar, said head restraint bar extending between a pair of guide blocks;
   e) a fixed adjustable bar mounted in said frame structure below said head restraint bar for supporting said head restraint bar using upwardly extending springs attached at lower ends thereof to said fixed bar and at upper ends thereof to said head restraint bar;
   f) vertical guide rods extending up through said guide blocks from said base for preventing said read restraint bar from twisting;
   g) a ram rod guide mounted on said upper horizontal cross bar;
   h) a slidable vertical ram rod extending through said ram rod guide terminating at a lower end thereof at said head restraint bar, said ram rod extending above said ram rod guide;
   i) a head shackle mounted on said head restraint bar adapted to restrain the head of said domestic fowl; and
   j) a slide hammer mounted on said ram rod above said upper horizontal cross bar for slamming said ram rod downwardly to cause cervical dislocation of said domestic fowl rendering said domestic fowl brain dead without any blood being spilled.

2. The apparatus of claim 1, in which said fixed adjustable bar is threadably engaged with said vertical guide rods for adjusting the vertical positions of said fixed adjustable bar and said head restraint bar.

3. The apparatus of claim 2, further comprising a slide hammer stop mounted on said ram rod under said slide hammer and above said upper horizontal cross bar to limit downward movement of said ram rod when being slammed downwardly.

4. The apparatus of claim 3, in which said springs are adapted to keep constant pressure on a neck and legs of said domestic fowl before said ram rod is slammed downwardly.

5. The apparatus of claim 4, in which said slide hammer weighs about five pounds.

6. The apparatus of claim 4, in which said head shackle has a v-shaped portion to allow the neck of said domestic fowl to be moved until a base of a skull of said domestic fowl is pressed against said head shackle so that all pressure is on the base of the skull.

7. The apparatus of claim 6, in which said springs bias the floating bar downwardly to place a body of said domestic fowl under tension.

8. A method for euthanasia of poultry, comprising the steps of:
   a) providing a framework for suspension of a domestic fowl comprising a base with a frame structure extending up from the base;
   b) providing an upper horizontal cross bar mounted in a top end of the frame structure;
   c) providing a pair of leg shackles attached to the upper horizontal cross bar adapted to support legs of the domestic fowl;
   d) providing a head restraint bar within the frame structure below the upper horizontal cross bar, the head restraint bar extending between a pair of guide blocks;
   e) providing a fixed adjustable bar mounted in the frame structure below the head restraint bar for supporting the head restraint bar using upwardly extending springs attached at lower ends thereof to the fixed adjustable bar and at upper ends thereof to the head restraint bar;
   f) providing vertical guide rods extending up through the guide blocks from the base for preventing the head restraint bar from twisting;
   g) providing a ram rod guide mounted on the upper horizontal cross bar;
   h) providing a slidable vertical ram rod extending through the ram rod guide terminating at a lower end thereof at the head restraint bar, the ram rod extending above the ram rod guide;
   i) providing a head shackle mounted on the head restraint bar adapted to restrain the head of the domestic fowl;
   j) providing a slide hammer on the ram rod above the upper horizontal cross bar;
   k) placing the legs of the domestic fowl in the leg shackles with the head of the domestic fowl extending downwardly;
   l) placing the head of the domestic fowl in the head shackle so that springs bias a body of the domestic fowl under tension; and
   m) slamming the slide hammer downwardly causing cervical dislocation of the domestic fowl without any blood being spilled.

9. The method of claim 8, in which the fixed adjustable bar is threadably engaged with the vertical guide rods for adjusting the vertical positions of the fixed adjustable bar and head restraint bar.

10. The method of claim 9, further comprising the step of attaching a slide hammer stop to the ram rod under the slide hammer and above the upper horizontal cross bar to limit downward movement of the ram rod when being slammed downwardly.

11. The method of claim 10, in which the springs keep constant pressure on a neck and legs of the domestic fowl before the ram rod is slammed downwardly.

12. The method of claim 11, in which the slide hammer weighs about five pounds.

13. The method of claim 11, in which the head shackle has a v-shaped portion to allow the neck of the domestic fowl to be moved until a base of a skull of the domestic fowl is pressed against the head shackle so that all pressure is on the base of the skull.

14. The method of claim 11, in which the springs bias the head restraint bar downwardly to place a body of the domestic fowl under tension.

\* \* \* \* \*